(12) United States Patent
Williams et al.

(10) Patent No.: US 9,085,420 B2
(45) Date of Patent: Jul. 21, 2015

(54) ORIENTING APPARATUS AND METHOD

(71) Applicant: The Procter & Gamble Company, Cincinnati, OH (US)

(72) Inventors: Roger Phillip Williams, Cincinnati, OH (US); Marc Richard Bourgeois, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 13/850,364

(22) Filed: Mar. 26, 2013

(65) Prior Publication Data

US 2014/0291116 A1 Oct. 2, 2014

(51) Int. Cl.
*B65G 47/244* (2006.01)
*B65G 17/34* (2006.01)
*B65G 37/00* (2006.01)

(52) U.S. Cl.
CPC .............. *B65G 47/244* (2013.01); *B65G 17/34* (2013.01); *B65G 47/2445* (2013.01); *B65G 37/005* (2013.01); *B65G 2201/0244* (2013.01)

(58) Field of Classification Search
CPC .......................... B56G 47/244; B56G 47/2445
USPC ............ 198/377.07–377.09, 411–412, 470.1, 198/471.1, 474.1, 620, 626.1, 803.5
See application file for complete search history.

(56) References Cited

U.S. PATENT DOCUMENTS

| | | | |
|---|---|---|---|
| 3,944,058 A | * | 3/1976 | Strauss .................... 198/377.07 |
| 4,545,476 A | | 10/1985 | Calvert |
| 4,561,534 A | | 12/1985 | Nalbach |
| 4,640,406 A | | 2/1987 | Willison |
| 4,653,628 A | | 3/1987 | Claypool et al. |
| 4,784,493 A | | 11/1988 | Turcheck, Jr. et al. |
| 4,880,100 A | | 11/1989 | Tweedy et al. |
| 5,009,305 A | | 4/1991 | Auld et al. |
| 5,040,661 A | | 8/1991 | Yasuda et al. |
| 5,058,724 A | | 10/1991 | Hinton |
| 5,560,471 A | | 10/1996 | Prochut |
| 5,579,890 A | * | 12/1996 | Harris ........................ 198/377.1 |

(Continued)

FOREIGN PATENT DOCUMENTS

| | | |
|---|---|---|
| DE | 4131068 A1 | 4/1993 |
| DE | 19927668 A1 | 12/2000 |
| EP | 0739834 A2 | 10/1996 |

OTHER PUBLICATIONS

International Search Report dated Jun. 2, 2014, 11 pgs.

*Primary Examiner* — Mark A Deuble
(74) *Attorney, Agent, or Firm* — Abbey A. Lopez; Jeffrey V. Bamber

(57) ABSTRACT

An orienting apparatus and method are disclosed. In one embodiment, the orienting apparatus is for orienting articles and for conveying the articles in a spaced apart relationship in a direction. The articles being conveyed have at least two opposing ends. The orienting apparatus includes a conveyor comprising at least a portion extending in the direction for assisting in conveying the articles in a spaced apart relationship. At least one rotatable platform is joined to the conveyor at a location. The rotatable platform is rotatable about an axis that is perpendicular to the conveyor at the location. One end of an article may be placed in contact with the rotatable platform. A device in operational communication with the rotatable platform rotates at least one platform and the article in contact therewith. The device for rotating the platform does not directly contact the article.

22 Claims, 7 Drawing Sheets

(56) References Cited

U.S. PATENT DOCUMENTS

| | | |
|---|---|---|
| 5,823,317 A | 10/1998 | Bankuty |
| 5,924,546 A | 7/1999 | Funaya |
| 5,975,278 A | 11/1999 | Ruth |
| 6,116,317 A * | 9/2000 | Tharpe et al. ............... 156/566 |
| 6,279,722 B1 * | 8/2001 | Bankuty et al. ............... 198/395 |
| 6,398,006 B1 * | 6/2002 | Dault ............... 198/377.01 |
| 7,572,123 B2 * | 8/2009 | Barker et al. ............... 425/392 |
| 7,798,308 B2 | 9/2010 | Ranger |
| 7,870,943 B2 | 1/2011 | Malini |
| 7,921,980 B2 | 4/2011 | Eder et al. |
| 2009/0218193 A1 | 9/2009 | Malini |

* cited by examiner

ORIENTING APPARATUS AND METHOD

FIELD OF THE INVENTION

The present invention is directed to an orienting apparatus and method, and more particularly to an orienting apparatus and method that can accommodate a variety of different size and shape articles.

BACKGROUND OF THE INVENTION

Bottle and other container orienting devices are known in the prior art and are used with conveyors which move the containers during their manufacture or subsequent filling, labeling, inspection, and packaging.

Such orienting apparatuses are described in the patent literature, and include, but are not limited to devices described in U.S. Pat. Nos. 4,545,476; 4,561,534; 4,640,406; 4,653,628; 4,784,493; 4,880,100; 5,009,305; 5,040,661; 5,058,724; 5,560,471; 5,823,317; 5,924,546; 5,975,278; 7,798,308 B2; 7,870,943 B2; 7,921,980 B2; and U.S. Patent Application Publication US 2009/0218193 A1.

However, such devices typically contact the sides or a feature (such as a neck) of the containers, and as a result are only capable of handling a single, or limited number of, sizes and shapes of containers. For example, some of such prior devices may rely on contacting a feature of the container, such as the neck of a bottle or the sides of a bottle in order to rotate the bottle to the desired orientation. In many cases, the mechanism (such as a belt, recessed wheel, etc.) that applies the force of rotation will be in direct contact with such portions of the container. If it is necessary to handle containers of different sizes and shapes, it often will be necessary to modify or change parts on such prior devices. This can be time-consuming, and result in undesirable downtime during which the equipment is not operational. The search for improved orienting apparatuses and methods for orienting articles has, therefore, continued.

SUMMARY OF THE INVENTION

The present invention is directed to an orienting apparatus and method for conveying articles on an automated handling line.

There are numerous non-limiting embodiments of the present invention. In one non-limiting embodiment, the orienting apparatus is for orienting articles and for conveying the articles in a spaced apart relationship in a direction. The articles being conveyed have at least two opposing ends. The orienting apparatus comprises:

a conveyor comprising at least a portion extending in the direction for assisting in conveying the articles in a spaced apart relationship;

at least one rotatable retainer joined to the conveyor at a location, wherein the rotatable retainer is rotatable about an axis that is perpendicular to the conveyor at the location, and wherein one end of an article may be placed in contact with the rotatable retainer; and a device in operational communication with the at least one rotatable retainer for rotating at least one retainer and the article in contact therewith, wherein the device for rotating the retainer does not directly contact the article.

BRIEF DESCRIPTION OF THE DRAWINGS

The following detailed description will be more fully understood in view of the drawings in which.

Figure 1:
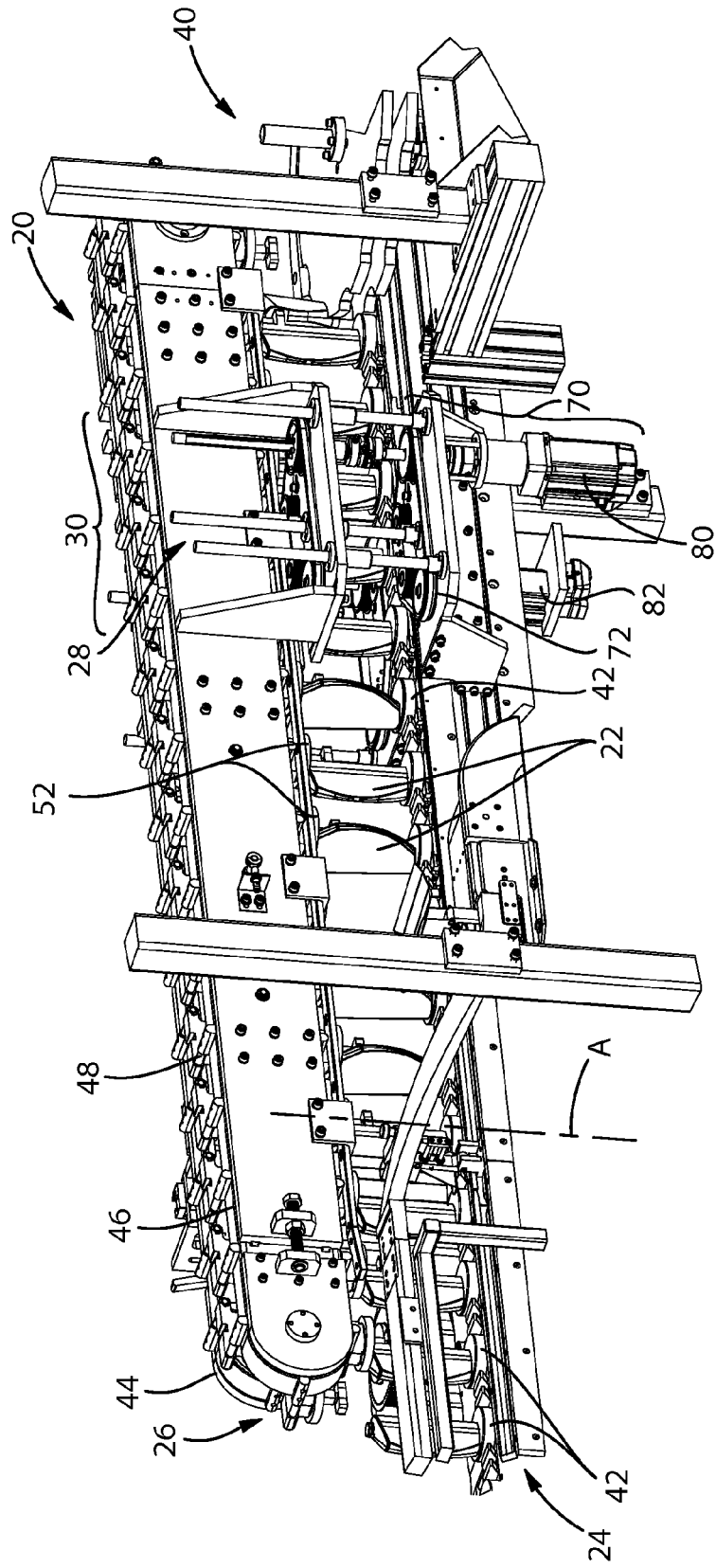
FIG. 1 is a perspective view showing one embodiment of an orienting apparatus.

The embodiment of the system shown in the drawings is illustrative in nature and is not intended to be limiting of the invention defined by the claims. Moreover, the features of the invention will be more fully apparent and understood in view of the detailed description.

DETAILED DESCRIPTION

The present invention is directed to an orienting apparatus and method, and more particularly to an orienting apparatus and method that can accommodate a variety of different size and shape articles.

FIG. 1 shows one non-limiting embodiment of an orienting apparatus 20 and method for conveying three-dimensional articles 22. In the embodiment shown in FIG. 1, the orienting apparatus 20 is part of a system that comprises a conveyor such as first conveyor 24, which in this embodiment is a lower conveyor. The conveyor may transport articles that are predominantly all in a certain general orientation, such as an upright orientation; an upside down orientation; or, a sideways orientation (such as with the top and bottom of the articles oriented out to the sides). As shown in FIG. 1, the articles 22 may be conveyed into the orienting apparatus in a spaced apart relationship. The system further comprises an optional second conveyor 26, which in this embodiment is an upper conveyor. It should be understood that in embodiments in which the conveyor transports articles in a sideways orientation, there will be a first laterally-oriented conveyor and a second laterally-oriented conveyor, rather than upper and lower conveyors. The articles 22 are turned to the desired orientation by an orienting device 28 that is located in an orienting zone 30.

The orienting apparatus 20 can be used to convey numerous different types of three-dimensional articles 22. Such articles include, but are not limited to: bottles; boxes; cans;

cartons; containers; laundry dosing balls; razors; razor blade heads and handles; sprayer triggers; tubs; tubes including, but not limited to tampon tubes; and deodorant stick containers. Additional articles include components of containers or packages including, but are not limited to: bottle caps; and bottle pre-forms that are subsequently blown into the form of a finished bottle. The orienting apparatus 20 can be used to convey and orient empty containers, partially filled, or full containers. Such containers may be capped or uncapped.

While the orienting apparatus 20 can easily transport conventionally-shaped articles (e.g., cylindrical, and/or symmetrical articles), the orienting apparatus 20 is particularly suited to transport and control articles having shapes that are challenging to transport by conventional means, including known types of orienting apparatuses. The orienting apparatus 20 can, for example, be used to transport: non-cylindrical bottles; bottles with non-flat or rounded bottoms, such as tottle bottles, that would be unstable on a horizontal surface; bottles with small bases that will easily tip; bottles without necks; bottles with angled and/or off-center necks; bottles with recessed necks; asymmetrical bottles; bottles of non-constant cross-section, etc.

Figure 2A:
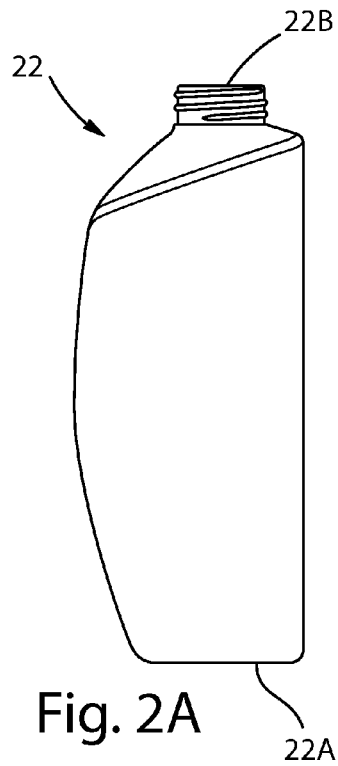
FIG. 2A is a front view showing one example of bottle that can be handled by the orienting apparatus.
Figure 2B:
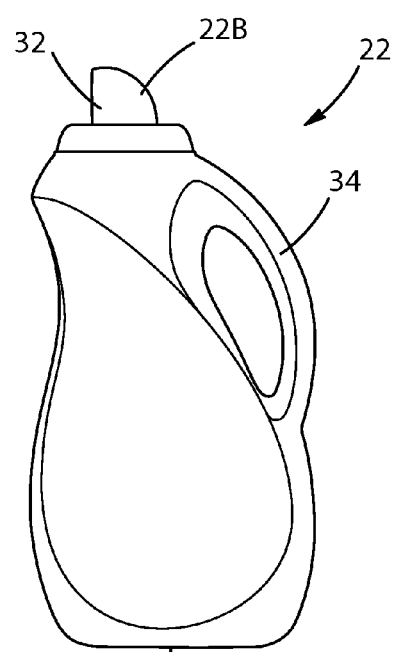
FIG. 2B is a front view showing another example of bottle that can be handled by the orienting apparatus.
Figure 2C:
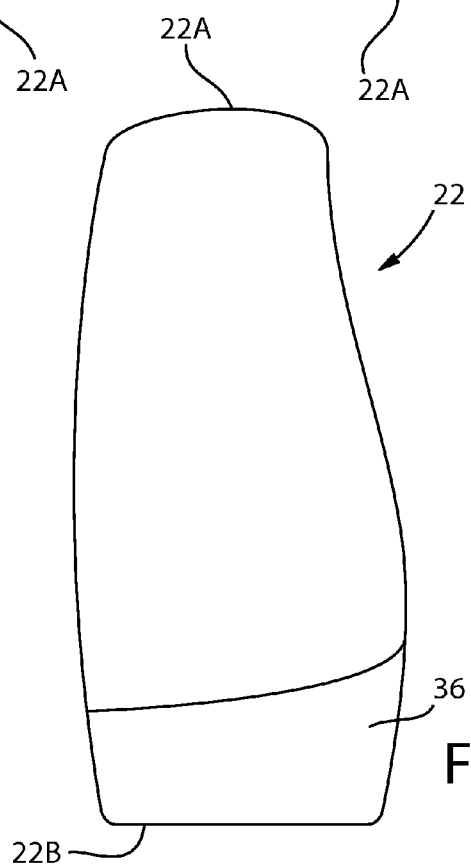
FIG. 2C is a front view showing another example of bottle that can be handled by the orienting apparatus.

The three-dimensional articles 22 will typically have at least two opposing ends. For example, in the case of a bottle, as shown in FIGS. 2A-2C, the bottle will have a base 22A and a top 22B. If the article is in the configuration of a rectangular prism (such as a box for a tooth paste tube), it may have more than two opposing ends. For example, a three-dimensional article in the configuration of a rectangular prism, or a cube, will have three sets of opposing ends. If the article is in the configuration of a rectangular prism (or other configurations) that is not a cube, the article may have a greater distance between certain sets of opposing ends than it has between other sets of opposing ends. The orienting apparatus 20 and method may in some embodiments, orient the article by handling it by at least one of the opposing ends of the set of opposing ends with the greatest distance therebetween. In other embodiments, the orienting apparatus 20 and method may orient the article by handling it by at least one of the opposing ends of the set of opposing ends with less than the greatest distance therebetween.

FIGS. 2A-2C show several non-limiting examples of such articles in the form of bottles. All of the bottles shown are asymmetrical about at least one axis. The bottle 22 shown in FIG. 2A is an enlarged version of the bottle shown being transported in FIG. 1. The bottle 22 shown in FIG. 2B has a spout 32 and a handle 34. The bottle 22 shown in FIG. 2C is an example of a tottle bottle. The tottle bottle 22 has a rounded bottom 22A that would be unstable on a horizontal surface. The other end, or top 22B of the tottle bottle 22 has a neck with an opening therein for filling and dispensing from the tottle bottle. The top 22B of the tottle bottle is shown with a cap 36 covering the neck and opening. The tottle bottle is filled with liquid when its top end 22B is pointing upward, but it is placed on a store shelf in an upside down orientation with its bottom end 22A pointing upward.

The orienting apparatus 20, as shown in FIG. 1, need not move in a circular path, or partially circular path, as in the case of circular (or "turret" type) rotating orienting devices. Thus, the orienting apparatus 20 may be of a non-circular type, or of a linear type. The term "linear", as used herein to modify the term "orienting apparatus", means that the apparatus moves an article in a generally linear direction (for example, in a longitudinal direction) through the orienting zone 28. The article 22 may be moved in a linear direction a minimum distance that is greater than a single point (such as the tangent point of a rotary orienting device) to a distance that is less than a pitch. If desired, the article 22 may be moved in a linear direction any suitable distance beyond such a minimum distance, including a distance: equal to a pitch; greater than a pitch; or any multiple of a pitch. The term "pitch", as used herein, refers to the distance between corresponding points on two adjacent properly-spaced articles. The orienting device may, thus, move (and move the articles) in a linear path, a curvilinear path, or a path that comprises both linear portions and curvilinear portions. Non-limiting examples of such paths include: rectilinear paths, elliptical paths, race track configured paths, irregularly-configured paths, open loop paths, and closed loop paths.

The orienting apparatus 20 may be capable of maintaining a consistent or fixed pitch between the articles 22 it conveys. It is often desirable for the orienting apparatus 20 to transport the articles at a fixed pitch which corresponds to (is equal to) the pitch designed to be received by any apparatus 40 that is downstream of the orienting apparatus 20. This is in contrast to some prior intermittent motion linear orienting apparatuses which stop the movement of the article in the direction it is being conveyed in order to rotate the same, producing an intermittent movement of articles. This may leave empty spaces or uneven spaces between the articles they are conveying. Of course, in less desired embodiments, the orienting apparatus 20 described herein may transport the articles 22 in an intermittent motion and/or leave unequal distances between the articles 22 being conveyed.

The first conveyor 24 can be any suitable type of conveying device that is capable of transporting, or assisting in (such as with another conveyor or device), the transport of three-dimensional articles 22. The phrase "at least assisting in" is intended to cover conveyors that either: transport articles on their own; or conveyors that assist in the transport of articles. Examples of suitable conveying devices include, but are not limited to one or more: conveyor belts, chain conveyors, conveyors comprising pucks, and conveyors on tracks. The term "puck", as used herein, refers to a cup-like guide for an end of an article, such as the base of an article.

The first conveyor 24 may include any suitable type of holder or retainer for the articles. In the embodiment shown, the first conveyor 24 comprises a plurality of spaced apart platforms (or "first platforms") 42 upon which the articles 22 are transported. The first conveyor 24 may not only transport the three-dimensional articles 22, but when combined with the orienting device 28, it may also be capable of rotating the three-dimensional articles 22 about an axis A. The axis A may be the central axis of the platform(s), which will correspond with the central axis of the articles 22 if the articles are centered thereon. The orienting device 28 may also be able to rotate the articles 22 to the desired orientation in cases where the articles 22 are off-center with respect to the platform 42 on with the article is sitting.

Figure 3:
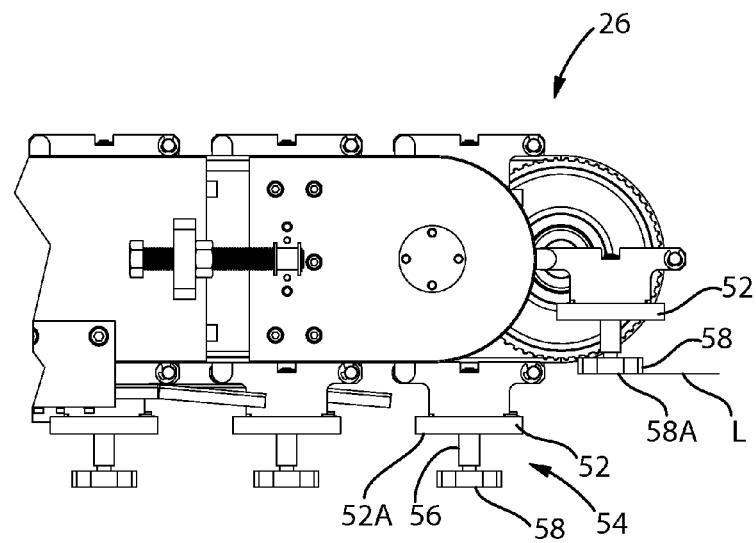
FIG. 3 is a schematic side view that shows the movement of the platforms relative to the second conveyor.

The optional second conveyor, or upper conveyor 26 in this embodiment, can comprise any of the types of conveying devices described above as being suitable for use as the first conveyor 24. In the particular embodiment shown, the upper conveyor 26 also comprises holders or retainers in the form of spaced apart platforms, which will be referred to herein as second platforms 52. The upper conveyor 26 comprises two endless belts 44 and 46 that are arranged parallel to each other side-by-side, and are linked together by transverse members 48 that hold the second platforms 52. As shown in FIG. 3, in this embodiment, the second platforms 52 are pivotably joined to the upper conveyor 26 so that the article-contacting surfaces 52A of the second platforms 52 are maintained in an orientation that is perpendicular to the ends of the articles 22 that they will be contacting throughout the entire rotation of the upper conveyor 26. In other words, the article-contacting surfaces 52A may be parallel to a horizontal line L throughout the rotation of the conveyor. If the second platforms 52 were not pivotably joined to the upper conveyor 26, the article-contacting surfaces 52A would face radially outward from the conveyors as the conveyors rotate. A similar pivotable arrangement of the platforms may also be present on the first conveyor 24.

The orienting apparatus 20, thus, comprises a first platform (which in the embodiment shown, is a base platform 42), an optional opposed second platform (which in the embodiment shown, is an upper platform 52), and an orienting device (or "device") 28 in operational communication with at least one of the base platform 42 and upper platform 52 for rotating at least one of the base and upper platforms 42 and 52, respectively. As shown in FIG. 1, the platforms 42 and 52 are arranged so that the axis of each second platform 52 is in substantial alignment with the axis of a first platform 42. The platforms 42 and 52 may be spaced at a fixed pitch, and may further be adjustably joined to their respective conveyors so that the pitch can be varied.

The holders or retainers, such as platforms 42 and 52, can be of any suitable size and configuration. It is not necessary that the platforms 42 and 52 be planar in configuration. In certain embodiments, however, it may be desirable for the platforms 42 and 52 to have an article-contacting surface, at least a portion of which is planar. The platforms 42 and 52 can be of the same, or substantially the same size and/or configuration, or of different sizes and/or configurations. In the embodiment shown, the first and second platforms 42 and 52 are in the form of circular disks of the same size, and are 100 mm in diameter.

The opposing platforms 42 and 52 have an initial distance therebetween which is larger than the distance between the opposing ends of the articles 22 that will be handled by the orienting apparatus 20. The opposing platforms 42 and 52 are then brought together to a distance that is equal to the distance between the opposing ends of the articles 22 in order to clamp the articles 22 therebetween. The conveyors 24 and 26 and/or the platforms 42 and 52 may optionally be provided with a manual or automated adjustment mechanism for adjusting the distance between opposing platforms 42 and 52 to accommodate different size articles. In other embodiments, the distance between opposing platforms 42 and 52 can be adjusted to accommodate different size articles by providing at least one set of the platforms with an adapter 54 (one example of which is shown in FIG. 3) that may be joined to one or both sets of platforms 42 or 52 to reduce the distance between opposing platforms 42 and 52 to accommodate smaller size articles. In the embodiment shown in FIG. 3, the adapter 54 is in the form of an extension 56 with a secondary platform surface 58. In such a case, the article-contacting surface 58A of the secondary platform surface 58 will contact one end of the article, rather than the surface of the platform 52 to which it is joined.

Figure 3A:
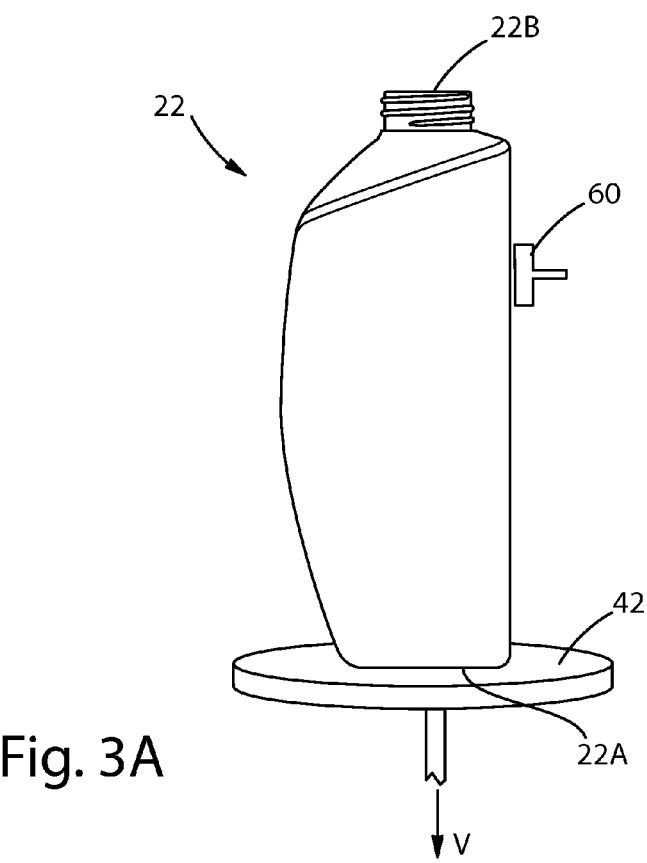
FIG. 3A is a schematic perspective view of alternative embodiments of retainers for holding a bottle in the orienting apparatus.
Figure 3B:
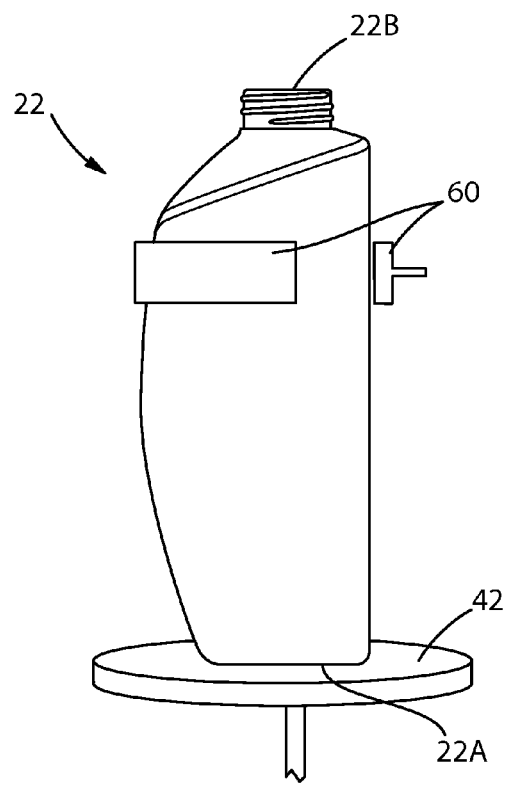
FIG. 3B is a schematic perspective view of another alternative embodiment of a retainer for holding a bottle in the orienting apparatus.

FIG. 3A shows that in other embodiments, such as those in which the articles 22 weigh enough or are otherwise substantial enough to be stable if they are only resting on, and rotated by the lower platform 42, the upper platform 52 may be replaced by an alternative type of holder or retainer 60. The holder or retainer 60 may be of any suitable configuration, and in any suitable location. In one embodiment, the holder or retainer 60 can be a non-contacting guide that does not contact the upper end of the article 22 (unless the article tips). As shown in FIG. 3B, such a guide could partially surround the upper end (or other portion) of the article 22 to maintain the article is its conveyance orientation if the article should tip or otherwise move out of its desired conveyance orientation.

Figure 3C:
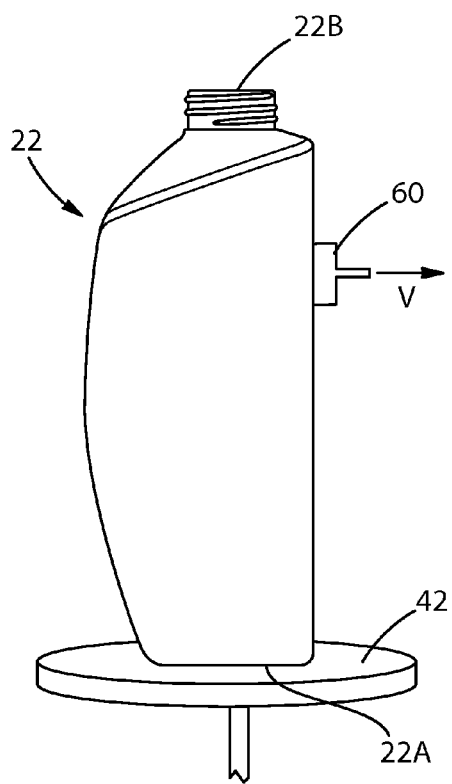
FIG. 3C is a schematic perspective view of another alternative embodiment of a retainer for holding a bottle in the orienting apparatus.

FIG. 3A shows that the holder or retainer 60 could be at another location (that is, other than at the end of the article in contact with the lower platform 42). As shown in FIG. 3C, in other embodiments, the holder or retainer 60 could be a vacuum holding mechanism (such as a suction cup) that holds the upper end of the article by vacuum as it is being conveyed, rather than by utilizing clamping forces or compressive forces applied on the opposing ends of the article 22 by the platforms 42 and 52. Such a variation may be of interest, for example, when handling pharmaceutical bottles and the like where it is undesirable for the equipment to contact the opening of a container. In these, or other embodiments, the articles 22 can be held on the lower platform 42 by vacuum, V, applied at or through the lower platform 42. Such an embodiment is particularly suitable for articles 22 that have a flat base (such as a base without channels therein), or any other suitably configured base, that can be held in place on the lower platform 42 by vacuum. In versions of this latter embodiment, the article 22 may be held in place on the lower platform 42 solely by vacuum, and it may not be necessary for the apparatus 20 to have a holder or retainer 60 (such as a guide or vacuum holding mechanism) for guiding or holding the articles 22 at another location on the articles.

In the embodiment shown, the platforms 42 and 52 are joined to the conveyors 24 and 26 in a manner so that the platforms 42 and 52 are able to generally freely rotate about an axis A perpendicular to the surface of the conveyors to which they are joined. The rotatable platforms 42 and 52, thus, can be considered to be passive in that unlike certain prior devices that employ moving belts or disks to directly contact the sides and/or necks of a container, the device for rotating the platforms 42 and 52 described herein does not directly contact the sides of the articles and/or necks of a container. The platforms 42 and 52 may be considered to comprise part of the conveyors and/or part of the orienting device 28. When it is said that the platforms 42 and 52 are able to "generally freely" rotate, it can be appreciated that the platforms 42 and 52 may be provided with a friction plate or other feature that allows the platforms 42 and 52 to rotate when desired (such as when contacted by rotating belts), but does not allow the platforms 42 and 52 to spin when not desired (such as due to any vibrations that may act on the platforms 42 and 52 when the articles 22 are being transported). The friction plate may provide the platform 42, 52 with a resistance to rotation that prevents such undesired rotation, but is easily overcome by the mechanism for rotating the platforms 42 and 52 (for example, when the sides of the platforms 42 and 52 are engaged by the belts).

The orienting device 28 may comprise a device for rotating the platforms, rotation mechanism 70, for rotating at least one of the platforms 42 and 52. The rotation mechanism 70 may rotate the lower platforms 42 only, the upper platforms 52 only, or both upper and lower platforms 42 and 52. The rotation mechanism 70 may rotate the platforms in a clockwise direction, a counter clockwise direction, or both clockwise and counter clockwise directions, when the system is viewed from above. If the rotation mechanism 70 rotates both upper and lower platforms, it will typically rotate the upper and lower platforms in the same direction. It may be desirable for the device to rotate both upper and lower platforms to avoid exerting torsion on the article 22, particularly in the case of light weight articles. The rotation mechanism 70 may rotate the platforms any number of degrees of rotation from zero to 360 degrees, or more. The rotation mechanism 70 is not limited to rotating the platforms any specific number of degrees such as 90° or 180°. Instead, the rotation mechanism 70 may rotate the platforms any desired amount (e.g., any 1 degree increment from zero to 360 degrees, or more).

As noted above, the rotation mechanism 70 is in operational communication with the platforms 42 and 52. The term "operational communication", as used herein, refers to any type of relationship between the platforms 42 and 52 and the rotation mechanism 70 that permits the rotation mechanism 70 to rotate one or both of the platforms. The rotation mechanism 70 may, for example, be in mechanical contact with the platforms (e.g., mechanically linked to the platforms) such as by a component of the rotation mechanism 70 such as belts, gears, etc.; or non-contacting communication such as by air jets; electric field; magnetic field, or other type of mechanism.

Figure 4:
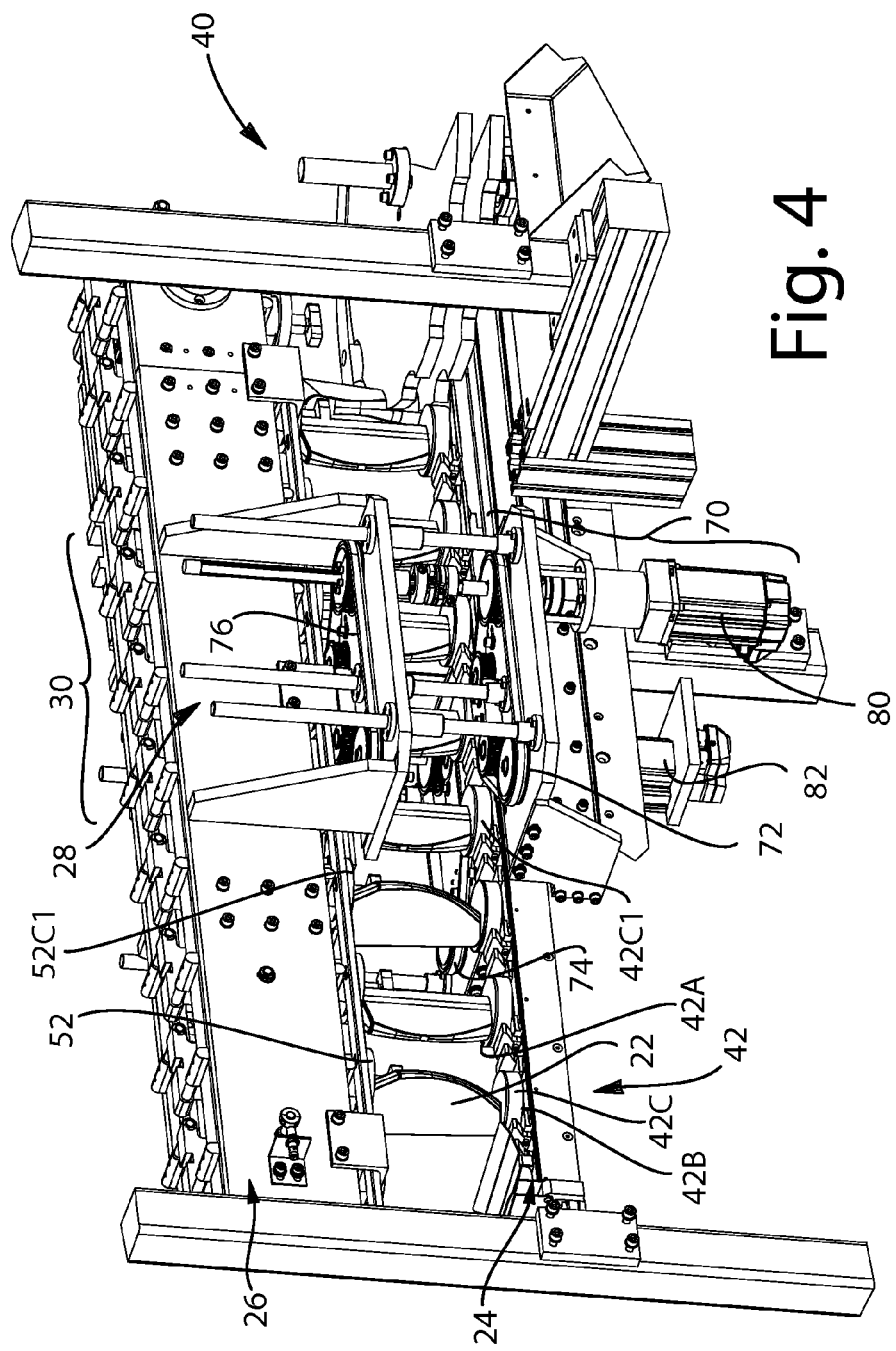
FIG. 4 is an enlarged perspective view of the orienting zone of the orienting apparatus shown in FIG. 1.
Figure 5:
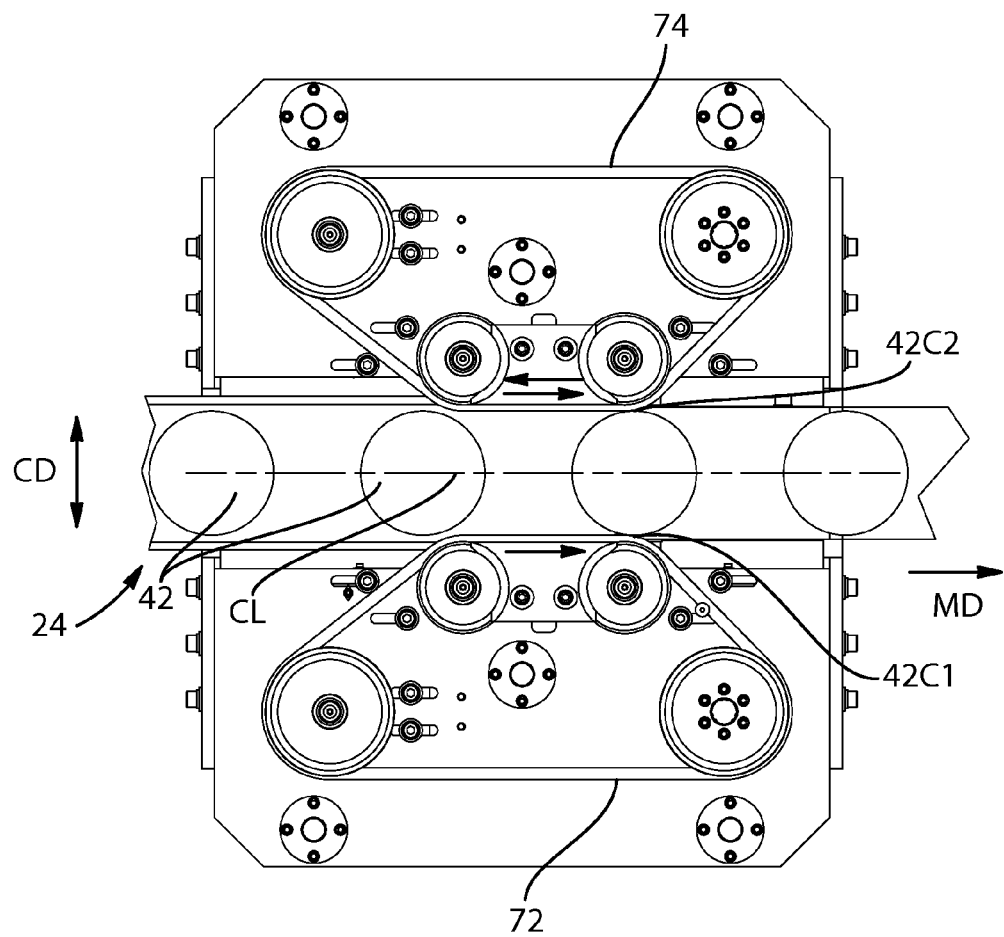
FIG. 5 is a schematic top view showing the platform drive belts of the orienting apparatus shown in FIG. 1.
Figure 6:
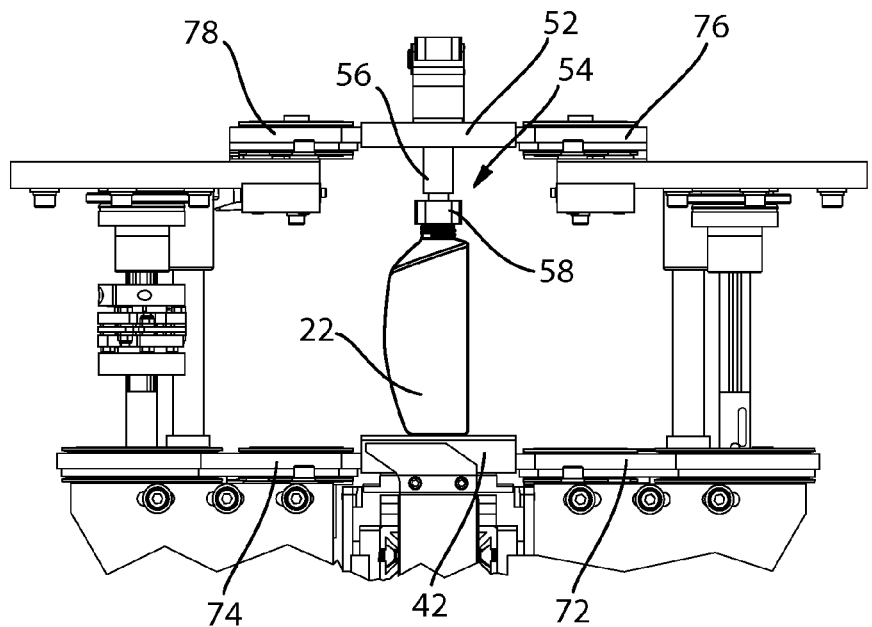
FIG. 6 is a schematic front view showing the platform drive belts of the orienting apparatus shown in FIG. 1.
Figure 7:
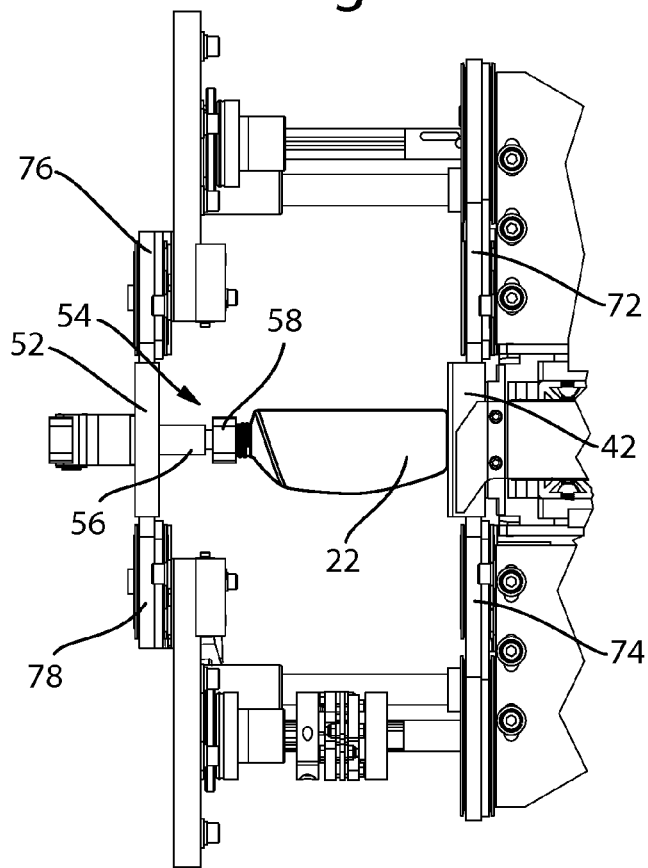
FIG. 7 is a perspective view showing an alternative embodiment of an orienting apparatus which transports articles in a sideways orientation.

In the embodiment shown in FIGS. 4-6, the rotation mechanism 70 comprises components, such as at least one belt 72 operationally connected to a motor 80. A suitable device for rotating only the lower platform 42 could be constructed with a single belt that engages the lower platform 42 either directly or indirectly. As shown in FIG. 4, the lower platform 42 has an article-contacting surface 42A, an opposed surface 42B, and sides 42C. Another belt 74 contacts different portions of the platforms 42, such as on the opposite sides of the platforms 42. The orienting apparatus 20 may have at least one moving belt in operational communication with one of the first and second platforms. The movement of the moving belt causes one of the first and second platforms to rotate. For example, as shown in FIG. 5, the first platform 42 has a first centerline, CL. The first platform 42 has a first side 42C1 on one side of the first centerline CL relative to the direction of linear movement of the first platform and a second side 42C2 on the other side of the first centerline. In other words, the first and second sides of the first platform 42 are disposed directionally away from the first centerline CL in the cross-machine direction, CD. Since the platforms 42 are rotatable, the "sides" 42C1 and 42C2 of the platform 42 may be constantly changing. The second platform 52 will similarly have a second centerline, and first and second sides 52C1 and 52C2 (the latter being hidden behind other elements in the drawings, and thus not shown).

The belts 72 and 74 may directly engage the sides 42C of the platforms 42 as shown. In other embodiments, the belt 72 and 74 may indirectly engage the platform 42, such as by engaging a gear underneath the platform 42. An advantage of the rotation mechanism 70 described herein is that, unlike in apparatuses that have belts which contact the articles 22 being conveyed directly, which require the belts to be changed or adjusted to accommodate articles of different shapes/sizes, the belt(s) in the apparatus shown do not need to be changed or adjusted to accommodate articles 22 of different shapes/sizes. Since the belts 72 and 74 only contact the platforms 42, the platforms 42 can be consistently configured and the belts 72 and 74 can be consistently spaced (such as 100 mm apart) regardless of the size or shape of the articles 22. The rotation mechanism 70 (the belts, or other mechanism) rotate the platforms 42, and need not act directly on the articles 22. In addition, no part of the orienting device 28 needs to contact a feature of the articles 22, such as the neck of a bottle or the sides of a bottle in order to rotate the article to the desired orientation.

In the embodiment shown, a more robust apparatus is provided that is capable of providing greater control over the articles than a device only having a lower platform. In the embodiment shown in the drawings, the first or lower platforms 42 are rotated by a pair of belts 72 and 74. The second or upper platforms 52 are also driven by a pair of drive belts 76 and 78. In this embodiment (where the platforms comprise a base platform and an upper platform disposed vertically above the base platform), the drive belts, such as belts 74 and 72, comprise left and right drive belts, respectively, when viewed from above as shown in FIG. 5. The left and right drive belts are described with respect to their orientation relative to the conveyors, such as conveyor 24, when viewed from above, and looking in the direction of movement of the articles (designated by the arrow pointing in the machine direction, MD). The drive belts may generally rotate in the direction of the arrows shown by each belt. One drive belt, in this case the right drive belt 72, generally rotates in the direction of movement of the conveyors. The other drive belt, the left drive belt 74 also rotates in the direction of movement of the conveyors. It should be understood that the direction of rotation of the drive belts refers to the direction of movement of the drive belts 72 and 74 at the location where the belts are closest to each other and in contact with the platforms 42. Although each drive belt can be driven by its own motor, in the embodiment shown, both of the right drive belts (top 76 and bottom 72) can be driven by a single motor 80, and both of the left drive belts 74 and 78 can be driven by a single motor 82.

The apparatus 20 may include an optional detection mechanism for detecting incoming articles which triggers the rotation mechanism. The detection mechanism can comprise any suitable type of mechanism including, but not limited to: vision sensors (such as a camera); or other article-contacting or non-contacting sensors. The detection mechanism can be positioned to detect the articles 22 before or at the platforms 42 and 52. The detection mechanism may be part of the orienting apparatus 20, or it could be part of a system that is upstream of the apparatus 20 which feeds information relating to the position and orientation of the articles 22 to controls for the orienting apparatus (such as to the rotation mechanism 70). The detection mechanism can be provided with the ability to detect one or more of the following conditions: whether there is an article at a platform 42; the orientation of the article, including whether the article needs to be turned or does not need to be turned; and, if the article needs to be turned, how much the article needs to be turned in order to place it in the desired orientation.

In operation, articles such as empty bottles 22 for example, are fed into the orienting apparatus 20 at a fixed pitch. At least one of the platforms on a conveyor will contact one of the ends of the article. For example, in the embodiment shown, each of the bottles 22 will be transported onto one of the first or lower platforms 42. If there is a second conveyor 26 with a set of second platforms 52, the second platforms 52 will be brought into contact with the opposing end of the articles, such as the top 22B of the bottles 22. As shown in FIG. 1, when there are two opposing platforms for containing opposing ends of the articles 22, at least one of the platforms (in the embodiment shown, the second platforms 52) will be moved closer to the other platform (the first platforms 42) to hold the article 22 therebetween. As shown in FIG. 1, typically, the articles 22 will be facing in different directions, and will need to be re-oriented by the orienting apparatus. In some embodiments, it is desirable for all of the articles 22 to be facing in the same direction for labeling and/or packaging into a carton. In other embodiments, it may be desired to orient the articles in a mixed orientation, for example, so that the articles may be packaged or bundled in a front to back arrangement. The orienting apparatus and method described herein can be operated to achieve any desired orientation for the articles 22.

The detection mechanism detects the orientation of the articles 22 at the platforms 42, or before the articles arrive at the orienting zone 30 of the orienting apparatus. The orienting device 28 may be configured to only act on a single article 22 at a time (in contrast to some prior devices that have a plurality of pockets with a drive mechanism associated with each article being conveyed in each pocket). If the detection mechanism detects that an article 22 is facing in the wrong direction, a signal is sent to the rotation mechanism 70. In the embodiment shown, the signal is sent to at least one of the motors 80 to turn at least one of the platform drive belts (or more commonly, both of the motors 80 and 82 to turn both sets of platform drive belts, such as 72 and 74).

The rotation mechanism 70 then rotates the platform 42 or platforms 42 and 52 to turn the article 22 so that it faces in the desired direction. In the embodiment shown, a signal is sent to both motors 80 and 82 to rotate the platform drive belts. The opposing left and right platform drive belts, 72 and 74, respectively, on the bottom conveyor 24 may pinch the platforms 42 therebetween to rotate the platforms 42. If there is upper conveyor 26, the same steps will occur to rotate the upper platforms 52.

If the article 22 is in the proper orientation, as shown in FIGS. 4 and 5, the right hand motor 80 will turn the right platform drive belt 72 so that it will rotate in the same direction as the flow of articles 22 on the conveyor 24 through the orienting zone 30, and the right platform drive belt 72 will rotate at substantially the same speed as the movement of articles 22 through the orienting zone 30. The left hand motor 82 (if present) will turn the left platform drive belt 74 (if present) so that it will rotate in the same direction as the flow of articles 22 on the conveyor 24 through the orienting zone 30, and the left platform drive belt 74 will rotate at substantially the same speed (or velocity) as the movement of articles 22 through the orienting zone 30.

If the incoming article 22 is not in the proper orientation, and must be rotated, the device for orienting the platforms (such as the belt or belts) is sped up on one side of the platform 42 to cause the platform 42 to turn while it is transporting the article. In some cases where the article 22 must be turned a great deal in order to properly orient the article 22, the device for orienting the platforms may (at least briefly) exert a force on the other side of the platform(s) 42 in the opposite direction (as shown by the second arrow associated with belt 74 in FIG. 5) to further assist the platform 42 in turning. The forces exerted on the platforms 42 will cause the article 22 to be rotated to face in the desired direction. This allows the orienting apparatus 20 to move the articles 22 continuously through the orienting zone 30 and to maintain a consistent or fixed pitch between the articles 22 it conveys. The orienting apparatus 20 may then hand the articles 22 off to another conveyor or device 40 downstream of the orienting apparatus Numerous variations of such a belt system are possible. There can be any suitable number of belts, and any suitable combination of movement of the belts to rotate the platform(s) 42 and 52. For example, there may be only belts on one side of each of the platforms 42 and 52 for rotating the platforms. In such cases, the belts may be on the same sides of the platforms 42 and 52 (e.g., each belt adjacent the first side of the platforms, such as 42C1 and 52C1); or, the belts may be on opposite sides of the platforms (e.g., one belt adjacent the first side 42C1 of one of the platforms 42, and the other belt adjacent the second side 52C2 of the other platform 52). In other embodiments, such as shown in the drawings, one or both of the platforms could have two belts for rotating the platform, with one on each side of the platforms.

The orienting apparatus and method may provide a number of advantages. The orienting apparatus does not directly contact the sides of the articles being conveyed. As a result, the orienting apparatus is not limited to handling a single, or limited number of, sizes and shapes of articles. Instead, the orienting apparatus and method that can accommodate a wide variety of size and shape articles without equipment modifications. The orienting apparatus is capable of assuming positive control of the articles and rotating and maintaining the spacing of the articles at a fixed pitch.

The term "joined to", as used in this specification, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined to" encompasses configurations in which an element is secured to another element at selected locations, as well as configurations in which an element is completely secured to another element across the entire surface of one of the elements.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "90 degrees" is intended to mean "about 90 degrees".

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An orienting apparatus for orienting articles and for conveying said articles in a spaced apart relationship in a direction, wherein the articles have at least two opposing ends, and said orienting apparatus comprises:
   a conveyor comprising at least a portion extending in said direction for at least assisting in conveying said articles in a spaced apart relationship, wherein said conveyor moves in a non-circular path;
   at least one rotatable retainer joined to said conveyor at a location, wherein said rotatable retainer is rotatable about an axis that is perpendicular to said conveyor at said location, and wherein one end of an article may be placed in contact with said rotatable retainer, wherein the article either rests on said rotatable retainer, or the article is clamped between the rotatable retainer and another element; and a device in operational communication with the at least one rotatable retainer for rotating at least one retainer and the article in contact therewith, wherein the device for rotating the retainer does not directly contact the article and no part of the orienting apparatus contacts the neck of an article in order to rotate the article, wherein the at least one rotatable retainer is rotatable by any number of degrees between 0° and 360°.

2. The orienting apparatus of claim 1 wherein the at least one rotatable retainer comprises a platform.

3. The orienting apparatus of claim 1 further comprising a vacuum mechanism for maintaining the articles on said at least one retainer while the articles are being conveyed and oriented.

4. An orienting apparatus for orienting articles and for conveying said articles in a spaced apart relationship in a direction, wherein the articles have at least two opposing ends, and said orienting apparatus comprises:
 a conveyor comprising at least a portion extending in said direction for at least assisting in conveying said articles in a spaced apart relationship;
 at least one rotatable retainer joined to said conveyor at a location, wherein said rotatable retainer is rotatable about an axis that is perpendicular to said conveyor at said location, and wherein one end of an article may be placed in contact with said rotatable retainer;
 a mechanism that at least guides the articles at another location on the articles, wherein the mechanism that at least guides the articles at another location on the articles comprises a second opposing conveyor having a non-contacting guide that does not contact the upper end of the article unless the article tips, which guide at least partially surrounds the upper end of the article to maintain the article is its conveyance orientation; and
 a device in operational communication with the at least one rotatable retainer for rotating at least one retainer and the article in contact therewith, wherein the device for rotating the retainer does not directly contact the article.

5. An orienting apparatus for orienting articles and for conveying said articles in a spaced apart relationship in a direction, wherein the articles have at least two opposing ends, and said orienting apparatus comprises:
 a conveyor comprising at least a portion extending in said direction for at least assisting in conveying said articles in a spaced apart relationship;
 at least one rotatable retainer joined to said conveyor at a location, wherein said rotatable retainer is rotatable about an axis that is perpendicular to said conveyor at said location, and wherein one end of an article may be placed in contact with said rotatable retainer;
 a mechanism that at least guides the articles at another location on the articles, wherein the mechanism that at least guides the articles at another location of the articles comprises a vacuum mechanism that contacts the articles at a location disposed away from the end of the article that is in contact with the rotatable retainer; and
 a device in operational communication with the at least one rotatable retainer for rotating at least one retainer and the article in contact therewith, wherein the device for rotating the retainer does not directly contact the article.

6. An orienting apparatus for orienting articles and for conveying said articles in a spaced apart relationship in a direction, wherein the articles have at least two opposing ends, and said orienting apparatus comprises:
 a first conveyor comprising at least a portion extending in said direction for assisting in conveying said articles in a spaced apart relationship, wherein said first conveyor moves in a non-circular path, said first conveyor comprising a first rotatable platform joined to said conveyor at a location, wherein said first rotatable platform is rotatable about an axis that is perpendicular to said conveyor at said location, and wherein one end of an article may be placed in contact with said first rotatable platform;
 a second conveyor comprising at least a portion extending in said direction for assisting in conveying said articles in a spaced apart relationship, said second conveyor comprising an opposed second rotatable platform separated from said first rotatable platform to provide a space therebetween, said second rotatable platform being for contacting the opposing end of the article, wherein at least one of said first platform and said second platform are movable relative to the other to set a distance between said platforms that is sufficient for holding an article between said platforms; and
 a device in operational communication with at least one of the first platform and second platform for rotating at least one of the first and second platforms.

7. The orienting apparatus of claim 6 wherein said conveyor conveys the articles at a fixed pitch.

8. The orienting apparatus of claim 6 wherein the device for rotating at least one of the first and second platforms does not directly contact the articles.

9. The orienting apparatus of claim 6 wherein the device for rotating at least one of the first and second platforms is in operational communication with at least one of the first and second platforms.

10. The orienting apparatus of claim 6 wherein the device for rotating at least one of the first and second platforms comprises a device that is in a non-contacting relationship with said first and second platforms.

11. The orienting apparatus of claim 6 further comprising a sensing device for detecting the orientation of said articles, wherein said sensing device is in operational communication with said device for rotating at least one of the first and second platforms.

12. The orienting apparatus of claim 6 wherein at least one of the first and second platforms is rotatable any number of degrees between 0° and 360°.

13. The orienting apparatus of claim 6 wherein at least one of the first and second platforms is rotatable in a clockwise direction and/or a counter clockwise direction.

14. An orienting apparatus for orienting articles and for conveying said articles in a spaced apart relationship in a direction, wherein the articles have at least two opposing ends, and said orienting apparatus comprises:
 a first conveyor comprising at least a portion extending in said direction for assisting in conveying said articles in a spaced apart relationship, said first conveyor comprising a first rotatable platform joined to said conveyor at a location, wherein said first rotatable platform is rotatable about an axis that is perpendicular to said conveyor at said location, and wherein one end of an article may be placed in contact with said first rotatable platform;
 a second conveyor comprising at least a portion extending in said direction for assisting in conveying said articles in a spaced apart relationship, said second conveyor comprising an opposed second rotatable platform separated from said first rotatable platform to provide a space therebetween, said second rotatable platform being for contacting the opposing end of the article, wherein at least one of said first platform and said second platform are movable relative to the other to set a distance between said platforms that is sufficient for holding an article between said platforms; and
a device in operational communication with at least one of the first platform and second platform for rotating at least one of the first and second platforms wherein the device for rotating at least one of the first and second platforms comprises at least one endless belt.

15. The orienting apparatus of claim 14 wherein the device for rotating at least one of the first and second platforms comprises a first endless belt in contact with the first platform and a second endless belt in contact with the second platform.

16. The orienting apparatus of claim 15 wherein the first and second platforms each have sides, and the device for rotating at least one of the first and second platforms comprises a first pair of endless belts, wherein each belt in said first pair is in contact with a different portion of the sides of the first platform and a second pair of endless belts, wherein each belt in said second pair is in contact with a different portion of the sides of the second platform.

17. A method for orienting articles that have at least two opposing ends, said method comprising the steps of:
 a) providing an orienting apparatus comprising:
  a conveyor extending in a direction for conveying said articles in a spaced apart relationship, wherein said conveyor moves in a non-circular path;
  at least one rotatable first platform joined to said conveyor at a location, wherein said rotatable first platform is rotatable about an axis that is perpendicular to said conveyor at said location, and wherein one end of an article may be placed in contact with said rotatable first platform, wherein the article either rests on said first platform, or the article is clamped between the first platform and another element, wherein the at least one rotatable first platform is rotatable by any number of degrees between 0° and 360°; and
  a rotating device in operational communication with at least said first platform for rotating at least said first platform;
 b) placing an article with one end adjacent said first platform wherein said first platform contacts the end of said article;
 c) rotating at least said first platform to change the orientation of the article.

18. The method of claim 17 wherein:
the other element comprises an opposed second platform separated from said first platform to provide a space therebetween, said second platform being for contacting the opposing end of the article, wherein at least one of said first platform and said second platform are movable relative to the other to set a distance between said platforms that is sufficient for holding an article between said platforms;
step b) comprises placing an article with one end adjacent said first platform and another end adjacent said second platform;
the method further comprises a step of moving at least one of said first platform and said second platform together so that said platforms contact the ends of the article and hold said article therebetween; and
step c) comprises rotating at least one of said first platform and said second platform to change the orientation of the article.

19. The method of claim 18 wherein the step (c) comprises rotating only one of said first platform and said second platform.

20. The method of claim 18 wherein the step (c) comprises rotating both of said first platform and said second platform.

21. The method of claim 18 wherein the rotating device comprises components, and said rotating device is in mechanical communication with at least one of the first platform and second platform, and when at least a component of said rotating device contacts said at least one platform at a contact point, said component of said rotating device moves in the direction the article is being conveyed.

22. The method of claim 21 wherein said component of the rotating device periodically moves in a direction opposite the direction the article is being conveyed.

* * * * *